(12) United States Patent
Chi

(10) Patent No.: US 8,452,762 B2
(45) Date of Patent: *May 28, 2013

(54) SYSTEMS AND METHODS FOR PROVIDING ADVANCED SEARCH RESULT PAGE CONTENT

(75) Inventor: Liang Yu Chi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 312 days.

This patent is subject to a terminal disclaimer.

(21) Appl. No.: 12/563,150

(22) Filed: Sep. 20, 2009

(65) Prior Publication Data

US 2011/0072046 A1    Mar. 24, 2011

(51) Int. Cl.
*G06F 17/30* (2006.01)

(52) U.S. Cl.
USPC .......................................... 707/723; 707/726

(58) Field of Classification Search
None
See application file for complete search history.

(56) References Cited

U.S. PATENT DOCUMENTS

| | | | |
|---|---|---|---|
| 6,961,731 B2 * | 11/2005 | Holbrook | 1/1 |
| 7,945,857 B2 * | 5/2011 | Deutscher et al. | 715/725 |
| 7,962,938 B2 * | 6/2011 | Barrett | 725/51 |
| 2002/0038299 A1 * | 3/2002 | Zernik et al. | 707/3 |
| 2006/0282413 A1 | 12/2006 | Bondi | |
| 2009/0007014 A1 | 1/2009 | Coomer et al. | |
| 2009/0089277 A1 | 4/2009 | Cheslow | |

FOREIGN PATENT DOCUMENTS

EP    1630642    3/2006

OTHER PUBLICATIONS

International Search Report issued on May 30, 2011 by the International Searching Authority in connection with International Application No. PCT/US2010/049278.

* cited by examiner

Primary Examiner — Baoquoc To
(74) Attorney, Agent, or Firm — Dentons US LLP

(57) ABSTRACT

The present invention provides a method and system for generating search results including receiving a search request and accessing a corpus of data to determine relevant content for inclusion in a search result set on the basis of the search request. The method and system includes determining at least one pivot data point, the at least one pivot data point being contextually related to the search result set on the basis of a review of the search result set and generating an active data link for refinement of the search result set on the basis of the data pivot point. The method and system further includes generating a search result output display for the presentation of at least a portion of the search result set and the active data links and toggling the search result output display to present refinement of the search results set.

9 Claims, 11 Drawing Sheets

US 8,452,762 B2

SYSTEMS AND METHODS FOR PROVIDING ADVANCED SEARCH RESULT PAGE CONTENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

Embodiments of the invention described herein generally relate to providing advanced content located on a search results page ("SRP"). More specifically, embodiments of the present invention are directed towards systems and methods for analyzing user query-related data and providing a plurality of novel, interactive controls or applications located within an SRP.

BACKGROUND OF THE INVENTION

As the Internet continues to exponentially expand, the role of search engines has dramatically increased. The sheer volume of data has quickly become impossible for a human user to manipulate on his or her own. Thus, the use of search engine technology has become a vital tool in the useful operation of the Internet.

Great strides have been made in optimizing search engines with respect to the quality of results returned in response to a query. Currently existing algorithms allow users to usually identify relevant websites within seconds of submitting a query. However, despite these advances very little advances have been made with respect to analyzing specific or aggregate user behavior and providing easily accessible data to the user directly on the SRP.

As an example, the current state of the art fails to capitalize on semantic data present within search engine results pages. Currently, many websites, including nearly all of the most frequently trafficked sites, contain semantic data such as RDF/XML, N3, etc. data that can be extracted and parsed into an easily accessible format for an end user. Additionally, many common search queries may be satisfied not by websites but by simple applications or widgets provided directly to the user. Thus, there currently exists a need for intelligent, user-centric search results pages.

SUMMARY OF THE INVENTION

The present invention is directed towards systems and methods for providing one or more refinements in response to a search query, including additional refinement of search results, as well as user interface components allowing for user access to refined data and other objects.

In one embodiment, generating search results includes receiving a search request that includes at least one search term and accessing a corpus of data relating to web content to determine relevant content for inclusion in a search result set on the basis of this search request. The generation of search results further includes determining at least one pivot data point, the at least one pivot data point being contextually related to the search result set on the basis of a review of the search result set. For a given data point, the system and method generates an active data link for refinement of the search result set on the basis of the data pivot point and generates a search result output display for the presentation of at least a portion of the search result set and the active data links. Therein, the method and system provides for toggling the search result output display to present at least a portion of a refinement of the search results set in response to selection of a given active data link for the one of the pivot data points.

In one embodiment, generating the search results includes receiving a search request including at least one search term and accessing a corpus of data relating to web content to determine relevant content for inclusion in a result set on the basis of the search request. The generation of search results includes determining at least one semantic object in the search results set, the semantic object being related data associated and contained within the web content on the basis of a review of the search result set. The method and system generates an object filter on the basis of the at least one semantic object and generates a search result output display for the presentation of at least a portion of the search result set and active data links for one or more of the semantic objects. Therein, the method and system provides for toggling the search result output display to present at least a portion of a subset of the search results set in response to selection of a given active data link, the subset of search results including web content having semantic object associated therewith.

In one embodiment, generating the search results includes receiving a search request including at least one search term and accessing a corpus of data relating to web content to determine relevant content for inclusion in a search result set on the basis of the search request. As used herein, a search request is synonymous with a search query. The method and system includes determining a plurality of applications associated with the search request and generating a search result output display for the presentation of at least a portion of the search result set and at least a portion of the applications.

Thereupon, the method and system generates improved search results, including contextual pivot data points, semantic object filtering and a query triggered application display.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
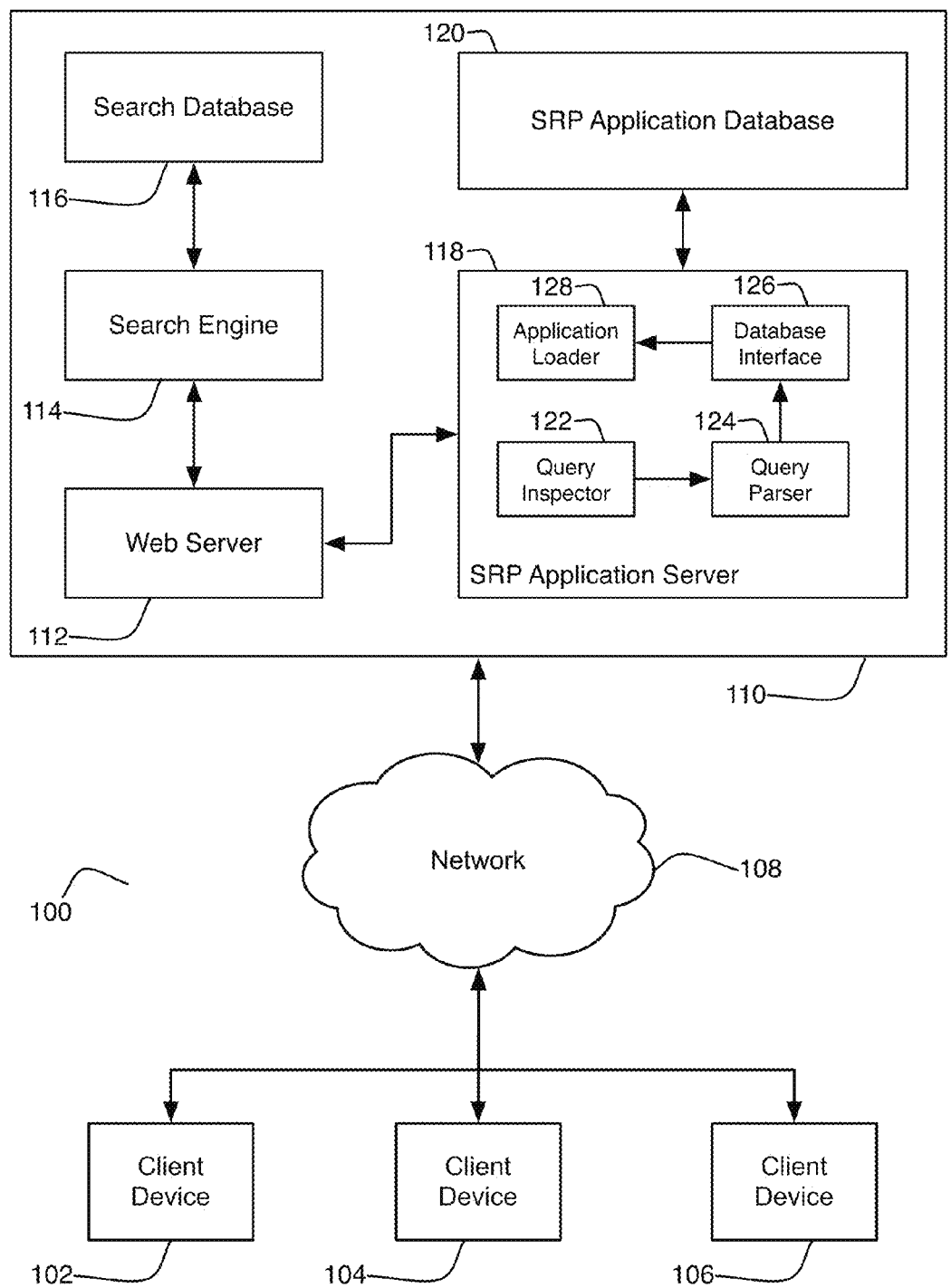
FIG. 1 presents a block diagram depicting a system for providing query triggered applications according to one embodiment of the present invention.

FIG. 1 presents a block diagram depicting a system for providing query triggered applications according to one embodiment of the present invention. As the embodiment of FIG. 1 illustrates, a plurality of client devices 102, 104 and 106 are connected to a search provider 110 via a network 108. The search provider 110 includes a web server 112, search engine 114, search database 116, SRP application server 118 and SRP application database 120. SRP application server 118 includes a query inspector 122, query parser 124, database interface 126 and application loader 128.

As used herein, an application may be any software implement capable of being able to communicate directly with other computers; dynamic interfaces for the users to interact with (as well as static presentations); and accessing corpora of data that is independent of the data used to generate the algorithmic search results.

Client devices 102, 104 and 106 may be general purpose computing devices (e.g., personal computers, television set top boxes, mobile devices, etc.) having a central processing unit, memory unit, permanent storage, audio/video output devices, network interfaces, etc. Client devices 102, 104 and 106 are operative to communicate via network 108, which may be a local or wide area network such as the Internet. In the present embodiment, client devices 102, 104 and 106 transmit requests to content provider 110 via the HTTP, WAP or similar protocol for the client/server exchange of text, images and other data.

Client devices 102, 104 and 106 are operative to transmit requests for search results to search provider 110, the search requests including search terms. The terms may be user generated search terms or can be user-assisted, i.e. suggested, search terms. In one embodiment, client devices 102, 104 and 106 may be operative to transmit an HTTP request containing a textual query string. For example, a user operating a client device 102, 104 and 106 may enter a query string with search terms such as "sushi in new york, ny" and submit the query via an HTML form element.

Search provider 110 receives queries from the client devices via web server 112. In one embodiment, web server 112 may comprise various hardware components running web server software such as APACHE HTTP SERVER, MICROSOFT IIS, or any other suitable web server software.

Web server 112 extracts the query string and generates a search engine request to be transmitted to search engine 114. Search engine 114 may comprise various hardware and software components operative to receive requests for search results, optimize search algorithms and extract data from the search database 116. Various search engine techniques that may be employed are well known in the art and are not discussed herein for brevity's sake.

Search engine 114 retrieves a plurality of search results from the search database 116. In one embodiment, search database 116 may comprise a plurality of indices allowing access to stored resource identifiers associated with a given query. After retrieving a plurality of search results, search engine 114 transmits the results back to web server 112.

In addition to retrieving a plurality of search results, web server 112 is further operative to transmit the received query to SRP application server 118. In one embodiment, SRP application server may comprise a single application server or multiple application servers operative to transmit and process data between SRP application database 120 and web sever 112.

When the SRP application server 118 receives a query from web server 112, query inspector 122 performs initial preprocessing on the query string. In one embodiment preprocessing may comprise formatting of a query string (e.g., removing white space, re-writing), term replacement (e.g., replacing obscure terms with suitable generic terms), query classification, entity identification, or other query parsing techniques known in the art. Query inspector 122 is communicatively coupled to query parser 124. Query parser 124 may break down the preprocessed query into discrete keyword components and transmit the keyword components to database interface 126. In the illustrated embodiment, database interface 126 receives keyword components and formulates a formal database request. For example, database interface 126 may be operative to retrieve a plurality of predefined request templates to access the SRP application database 120. In response to receiving a plurality of keywords, database interface 126 may select an appropriate request template and transmit the request to SRP application database 120.

SRP application database 120 may comprise one or more database, each of the databases being operative to store information related to SRP applications. In one embodiment, SRP application database 120 comprises an index database storing metadata associated with an application (e.g., title, keywords, etc.) and an application database storing executable code associated with a given application.

Database interface 126 may receive the application data from SRP application database 120 and forward the received data to application loader 128. In one embodiment, application loader 128 is operative to format and package the received application data into a format suitable for inclusion on an SRP. For example, application loader 128 may fill any variable data associated with the application such as advertisement data, current time data or any other data that may be determined at runtime.

Application loader 128 is further operative to transmit the packaged application(s) back to web server 112. In response, web server 112 may combine the application package(s) with the previously received search results. In one embodiment, combining application(s) with search results may comprise identifying sections of a predefined SRP template and placing the search results and application(s) in the respective template locations. As discussed in further detail below, the applications, when loaded, may utilize additional information for execution, including in one embodiment data native to the processing system whereupon the SRP is being displayed.

It is noted, another embodiment may include the direct display or launching of an application, omitting the search results or displaying the search results in a secondary or otherwise ancillary display.

Figure 2:
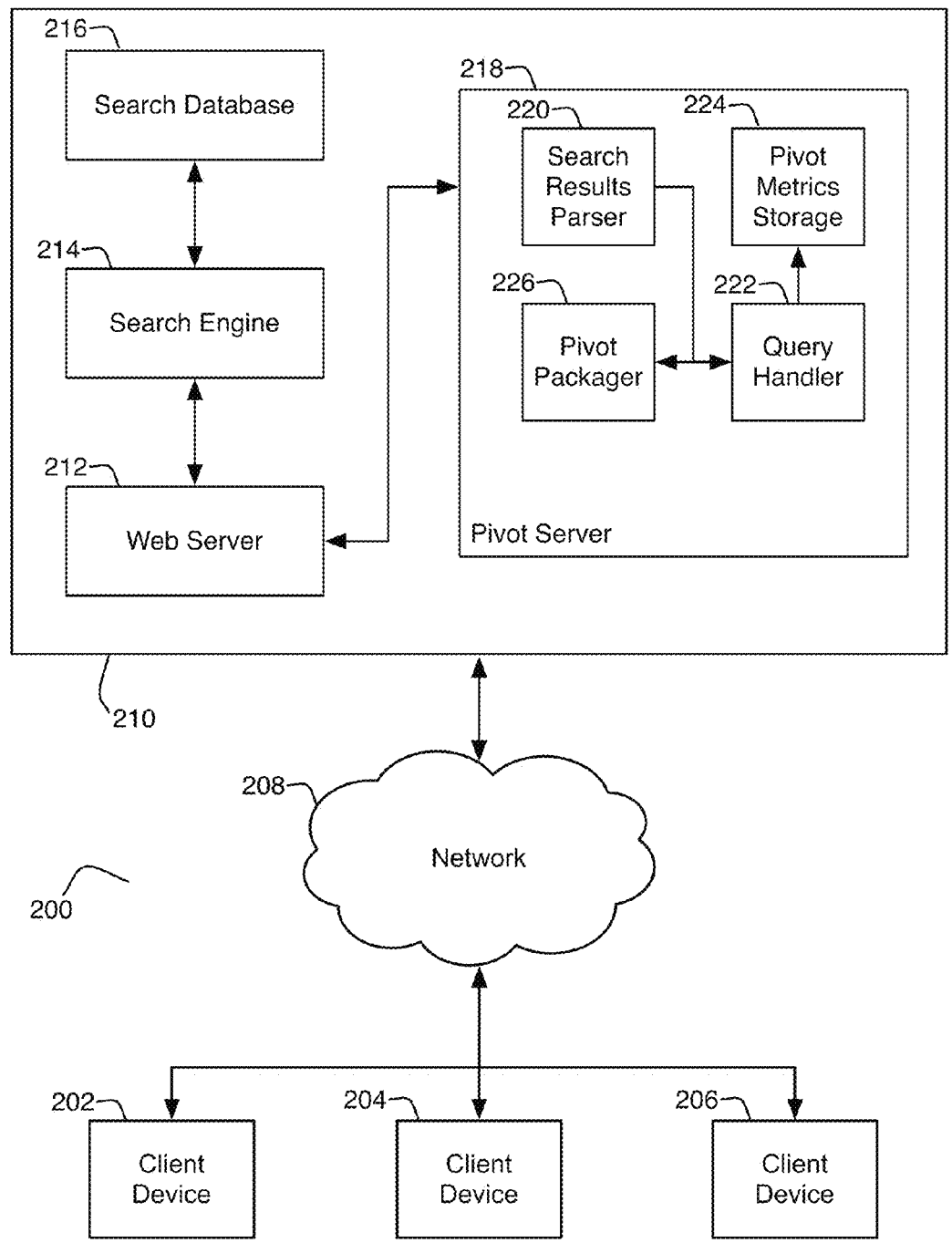
FIG. 2 presents a block diagram depicting a system for providing query-based pivot data points according to one embodiment of the present invention.

FIG. 2 presents a block diagram depicting a system for providing query-based pivot data points according to one embodiment of the present invention. As the embodiment of FIG. 2 illustrates, a plurality of client devices 202, 204 and 206 are connected to a search provider 210 via a network 208. According to the embodiment of FIG. 2, the search provider 210 comprises a web server 212, search engine 214, search database 216 and pivot server 218. Pivot server 218 comprises a search results parser 220, query handler 222, pivot metrics storage 224 and pivot packager 226.

In general, the operation of client devices 202, 204 and 206 with respect to requesting search results from web server 212, search engine 214 and search database 216 are substantially similar in operation with respect to elements 102, 104, 106, 112, 114 and 116 and will not be repeated for brevity.

In the embodiment of FIG. 2, web server 212 may further be operative to transmit the retrieved search results to the pivot server 218. In the illustrated embodiment, search results may be received by the search results parser 220. Search results parser 220 performs parsing operations on the received search results, such as grouping search results by domain or other pivot point. Search results parser 220 then transmits the parsed results to query handler 222.

In one embodiment query handler 222 receives the submitted query from web server 212 along with the parsed search results. Query handler 222 may be operative to extract a plurality of pivot metrics from pivot metrics storage 224 based on the parsed search results and generate a plurality of pivot data points. For example, pivot metrics storage 224 may contain domain-specific attributes that are to be applied to a given pivot data point (e.g., domain-specific search query parameters). Additionally, query handler 222 may be operative to analyze the given query to further refine the pivot data points selected. For example, query handler 222 may be operative to categorize the type of query as one directed towards shopping, travel, people, etc. This categorization may be used to narrow the list of pivot data points. For example, a search related to shopping may allow query handler 222 to ignore results from a social networking site when identifying domain-specific pivot data points.

After retrieving a plurality of pivot data points, query handler 222 may transmit the pivot data points to pivot packager 226. As used herein, the pivot data points are data points to refine the search based on the specific data, such as the example being refining to a specific web location, which is examplery and not a limiting example. In one embodiment, pivot packager 226 may be responsible for preparing the pivot data point for insertion into an SRP. For example, pivot packager 226 may be operative to construct a representation of the pivot data point including images, JavaScript and active data links (e.g., HTML hyperlinks) associated with the data pivot point.

Pivot packager 226 is further operative to transmit the packaged pivot package(s) back to web server 212. In response, web server 212 may combine the pivot package(s) with the previously received search results. In one embodiment, combining pivot package(s) with search results may comprise identifying sections of a predefined SRP template and placing the search results and pivot package(s) in the respective template locations. Exemplary embodiments of an SRP are further discussed with respect to FIG. 7 through 9, as well as the flowchart of FIG. 4.

Figure 3:
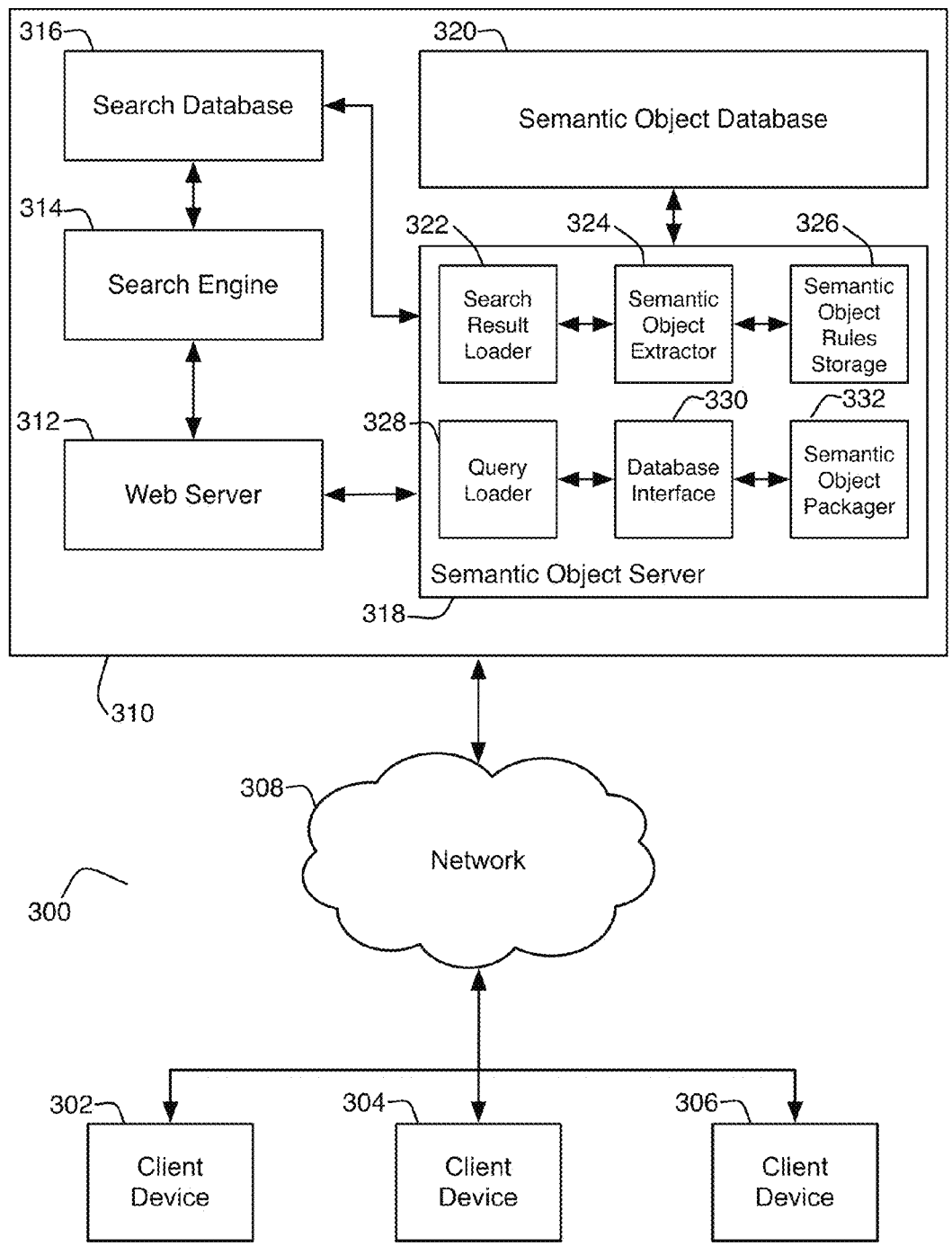
FIG. 3 presents a block diagram depicting a system for identifying semantic objects in a search database and providing semantic object context links according to one embodiment of the present invention.

FIG. 3 presents a block diagram depicting a system for identifying semantic objects in a search database and providing semantic object context links according to one embodiment of the present invention. As the embodiment of FIG. 3 illustrates, a plurality of client devices 302, 304 and 306 are connected to a search provider 310 via a network 308. According to the embodiment of FIG. 3, the search provider 310 comprises a web server 312, search engine 314, search database 316, semantic object server 318 and semantic object database 320. Semantic object server 318 comprises a search result loader 322, semantic object extractor 324, semantic object rules storage 326, query loader 328, database interface 330 and semantic object packager.

In general, the operation of client devices 302, 304 and 306 with respect to requesting search results from web server 312, search engine 314 and search database 316 are substantially similar in operation with respect to elements 102, 104, 106, 112, 114 and 116 and will not be repeated for the sake of brevity.

Semantic object server 318 manages the semantic object data located within search results stored in the search database. The semantic object server 318 is additionally operative to handle the management and retrieval of semantic object data in response to a search query including search terms.

In one embodiment, search results loader 322 is operative to receive search results from search database 316. In one embodiment, search database 316 may transfer unanalyzed search results to the search results loader 322. For example, prior to finalizing a crawled search result, search database 316 may transmit the search result to search result loader 322 for processing. Alternatively, search results loader 322 may pull search results from the search database 316 and control the analysis of search results.

Search result loader 322 transmits search results to semantic object extractor 324. In the illustrated embodiment, semantic object extractor 324 retrieves semantic object definitions from semantic object rules storage 326. Semantic object definition may comprise structured data that describes the format of semantic data in accordance with known techniques associated with semantic data. For example, the semantic object definition may describe the fields and parameters within a semantic object.

After accessing the semantic object definitions, the semantic object extractor 324 analyzes a given search result and determines if one or more semantic objects are present within the search result. In one embodiment, semantic object extractor 324 parses the content of a search result's associated page (e.g., HTML source code) and identifies page content that matches patterns described by a semantic object definition.

If the semantic object extractor 324 detects one or more matches with semantic objects, the semantic object extractor 324 retrieves pre-defined semantic objects from the semantic object database 320. In one embodiment, semantic object database 320 may store a plurality of predefined semantic object components including image data, executable code data and markup data.

Semantic object server 318 may further process user queries through the query loader 328 to determine whether semantic object definitions correspond to the user query. For example, the query loader 328 may determine that a submitted user query may potentially be directed towards video search results. In this embodiment, the query loader 328 may analyze the query keywords and query semantic object database 320 to determine if the associated search results contain appropriate semantic objects. For example, a user query for "pearl jam" may result in a semantic object match for video objects. In this example, database interface 330 may query semantic object database 320 to determine if any video objects are present within the search results for the query "pearl jam".

In an alternative embodiment, semantic object server 318 may analyze the search results for a given query to determine if semantic objects are present without analyzing the user query. For example, the semantic object server 318 may cross-reference search results with entries within the semantic object database 320 and determine which semantic objects are present within the search results. In another embodiment, semantic objects come back with the results and the system applies application logic in the proxy to determine what to do based on what results and objects are coming back.

When the semantic object server 318 determines that semantic objects exist within a search result set, the semantic object packager 332 packages a semantic object filter. In one embodiment, a semantic object filter may comprise a plurality of components including an active data link identifying the semantic object, various image elements as well as markup language for describing the appearance of the object filter. In alternative embodiments, semantic object server 318 may further be operative to determine which objects should or should not be shown. For example, semantic object server 318 may utilize a predetermined scenario-based threshold for determining the number of semantic object filters to be displayed. Alternatively, various other metrics may be used to define the number of results displayed.

Semantic object packager 332 is further operative to transmit the packaged object(s) back to web server 312. In response, web server 312 may combine the packaged object(s) with the previously received search results. In one embodiment, combining packaged object(s) with search results may comprise identifying sections of a predefined SRP template and placing the search results and packaged object(s) in the respective template locations.

Although illustrated as three disparate environments, the servers 118, 218 and 318 may alternatively be operating simultaneously with a web server, search engine and search database. In this embodiment, the server 118, 218 and 318 may all be communicatively coupled a web server, search engine and search database and may perform the aforementioned processing simultaneously.

In an additional environment, FIGS. 1 through 3 may further include an auction server located at the search provider 110, 210 and 310 to communicate with advertisers. In this embodiment, advertisers may submit applications, pivot packages, semantic objects and other objects to be included on SRPs. For example, advertisers may further bid on placement of the submitted applications similar to current advertising architecture regarding placement of advertisements on SRPs.

Furthermore, the systems described in FIGS. 1 through 3 may be combined with other query processing technologies. For example, the above server may work in conjunction with history based processing applications such as session data analysis applications. In this embodiment, the system may be operative to analyze the past history of a user in a given time period to determine the context of the given search. For example, a search for "jaguar" following the searches "cars", "buick" and "ford" may indicate that the user is not interested in animals, but interested in JAGUAR® automobiles. Thus, the system may limit the aforementioned systems to focus on pivot data items, semantic object filters or applications associated with automobiles.

Figure 4:
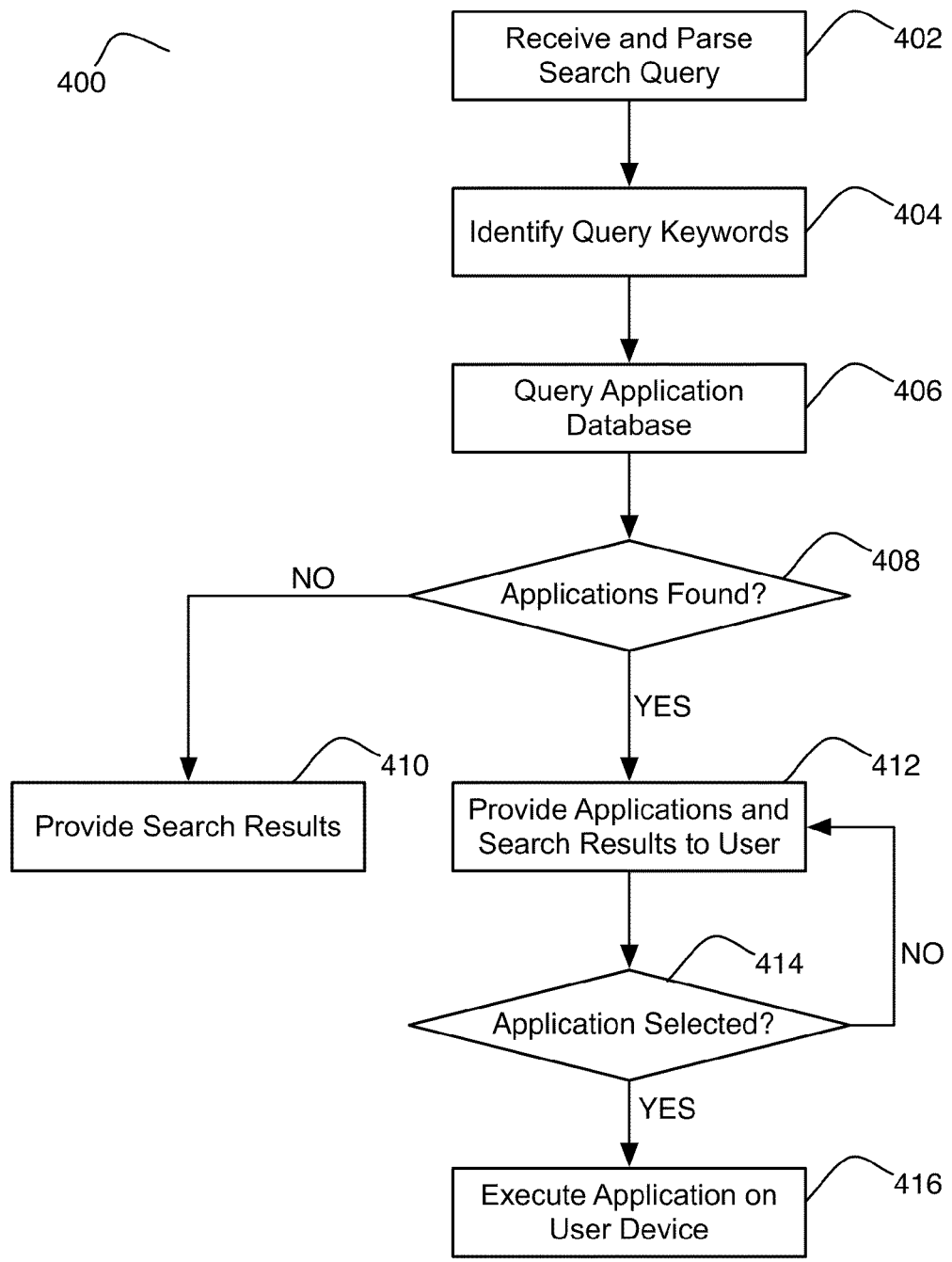
FIG. 4 presents a flow diagram illustrating a method for providing query triggered applications according to one embodiment of the present invention.

FIG. 4 presents a flow diagram illustrating a method for providing query triggered applications according to one embodiment of the present invention. In one embodiment, the method of FIG. 4 may be executed within the system 100 of FIG. 1. According to the embodiment FIG. 4 illustrates, a method 400 receives and parses a search query, step 400. In the illustrated embodiment, the method may receive a search query via an HTTP request from an end user utilizing a search portal as known in the art. The method 400 then may parse the search query according to a predefined set of rules. For example, the method 400 may trim the query of garbage or whitespace characters or other preprocessing algorithms known in the art.

The method 400 then identifies relevant query keywords, step 404. In this step, the method 400 intelligently determines the context and intent of the user query by analyzing the words of the keywords as well as their syntactical placement. For example, a trivial query such as "mortgage calculator" may be identified as being associated with calculator applications related to mortgages. A more complex example such as "sushi restaurants in new york, ny" may identify three general keywords: a type of business (restaurant), a "genre" or industry of the business (sushi) and location keyword (New York City). In alternative embodiments, the method 400 may parse these three keywords further as a general application identifier such as "restaurants". In another embodiment, the method 400 may intelligent transform a query into an associated topic. For example, if the user enters the query "2+2", the method 400 may determine the user's query is directed towards a mathematical calculator.

After identifying query keywords, the method 400 queries an application database, step 406. In one embodiment, the method 400 may utilize a pre-defined database interface to extract applications within the database that are associated, or are similar matches, to the identified keywords. In one embodiment, the method 400 may further determine a confidence value based on comparing the query to the description of a given application.

If applications are not found for the identified keywords, step 408, the method simply provides the matching search results, step 410. For example, the method 400 may not find any applications associated with the keywords if the user query is directed to an obscure topic lacking applications.

If the method 400 determines applications exist for a user query, the method therein provides the applications and search results to a user, step 412. In one embodiment, providing applications may comprise providing a packaged application object embedded within a search results page.

The method 400 provides the applications and search results to a user and monitors the applications to determine if a user selects the application, step 414. Selecting an application may comprise clicking on the object with a mouse, entering a keystroke, or any user input action known in the art. In one embodiment, monitoring user interaction may be accomplished via client-side executable code such as JavaScript, Flash, or similar client side techniques.

If the method 400 determines a user selects an application, the method executes the application on the user device, step 416. In one embodiment, executing an application may comprise loading the application from local storage. For example, an application may be embedded, but inactive, on an SRP. In response to selecting the application, the method 400 simply activates and displays the application. In alternative embodiments, the method 400 may access remote storage in response to a user selection. In this embodiment, the method 400 may asynchronously retrieve the application data and after receipt may execute the application. The application may be performed within the SRP or can be in a separate display.

The execution of the application may utilize local data, where possible. For example, if a user has existing data usable by the application, such as previously entered information or profile information, the application may interact with local storage for improving user functionality.

It is noted that this query triggered application response may be based on non-web content data. For example, in one embodiment, the search may be performed on a data feeds, including third party data feeds. In this embodiment, the method includes registering a plurality of data feeds including a third party data feed and creating a persistent store for the feed data that stores and updated the feed data. Moreover, the feed data may include, but is not limited to, a list of entities in a given domain and metadata about the entities. Therefore, the method for generating search results may also include serving the search request on the data feed.

In another embodiment, additional refinements of the search operations may include determining a most appropriate vertical search engine for the given query. This may be performed by the analysis of the search terms and/or an analysis of the type of search results. Thus, the SRP may include the search results from this most appropriate vertical search engine.

Figure 5A:
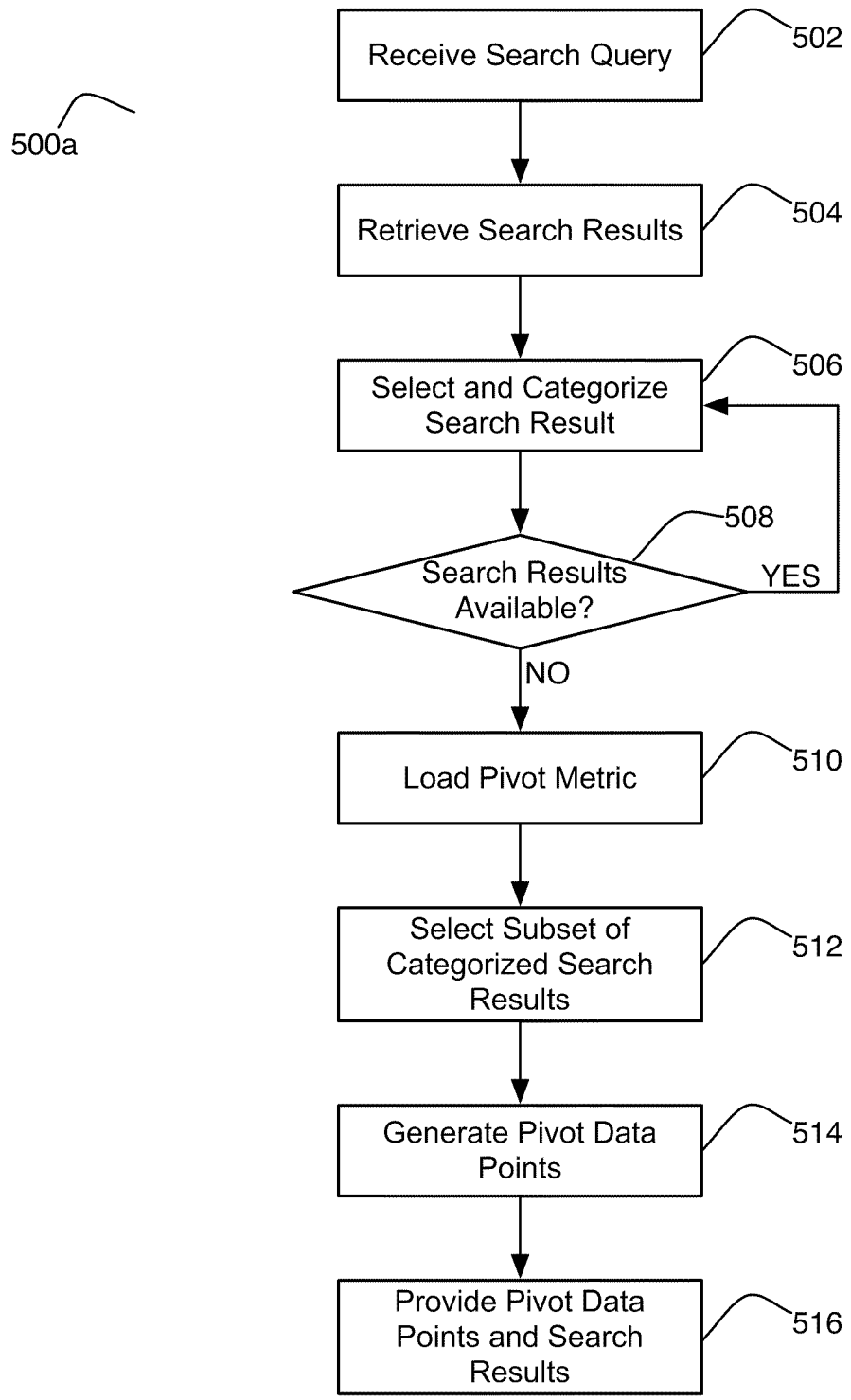
FIG. 5a presents a flow diagram illustrating a method for providing pivot data points associated with a search result set according to one embodiment of the present invention.

FIG. 5a presents a flow diagram illustrating a method for providing pivot data points associated with a search result set according to one embodiment of the present invention. It is noted that the method of FIGS. 5a and 5b may be executed within the system 200 of FIG. 2. According to the embodiment FIG. 5a illustrates, the method 500a receives a search query, step 502. In the illustrated embodiment, the method 500a may receive a search query via an HTTP request from an end user utilizing a search portal as known in the art. The method 500a subsequently retrieves search results associated with the query, step 504. Search result retrieval techniques are commonly known in the art and are not reiterated for the sake of brevity.

The method 500a selects a given search result and categorizes the result, step 506. The method 500a categorizes the search results until it generates a requisite number of search result listing, step 508. In one embodiment, the method 500a may categorize all search results. In alternative embodiments, the method 500a may limit the number of categorized search results based on a pre-determined threshold quantity.

In one embodiment, categorizing a search result may comprise determining the domain name of a search result. For example, the method 500a may determine the number of search results belonging to "example.com" and may store this categorical data locally. In alternative embodiments, the method 500a may categorize the results according to any predetermined categorization schemes.

After categorization, the method 500a loads pivot metrics, step 510. In one embodiment, pivot metrics may comprise any metadata associated with a given category. For example, pivot metrics may constrain the application of categories based on the number of results matched. That is, a given category will only be applied if the number of matched results exceeds a predetermined threshold. Alternatively, pivot metrics may comprise any metadata associated with a given category or domain.

The method 500a then selects a subset of the categorized search results, step 512. Selecting a subset of categorized search results may comprise extract the top N categories, as defined by a predetermined threshold. For example, the method 500a may determine that only the top three categories should be utilized.

The method 500a generates pivot data points based on the categorized search results, step 514. In one embodiment, generating a pivot data point may comprise generating a self-contained object that can be placed within an SRP. For example, the method 500a may utilize pivot metric data and may generate or identify an image associated with the category, an HTML active data link associated with the pivot point and associated executable code such as JavaScript that is associated with the pivot data point. The method 500a may combine these and various other forms of data to generate the self-contained pivot data point. Herein, an active link may be generated based on the pivot data point, e.g. the point may be the content specifying the web location, e.g. "www.example.com" and the active link is the visual representation or manifestation of that pivot point, the active link being encoded into the SRP and the interface element which the user may select.

Finally, the method 500a provides the pivot data points and search results to a user in the SRP, step 516. In one embodiment, the method 500a embeds the previous generated pivot data point code within an SRP or SRP template, for example in a left-hand side bar, as noted in FIGS. 7-9 below.

Figure 5B:
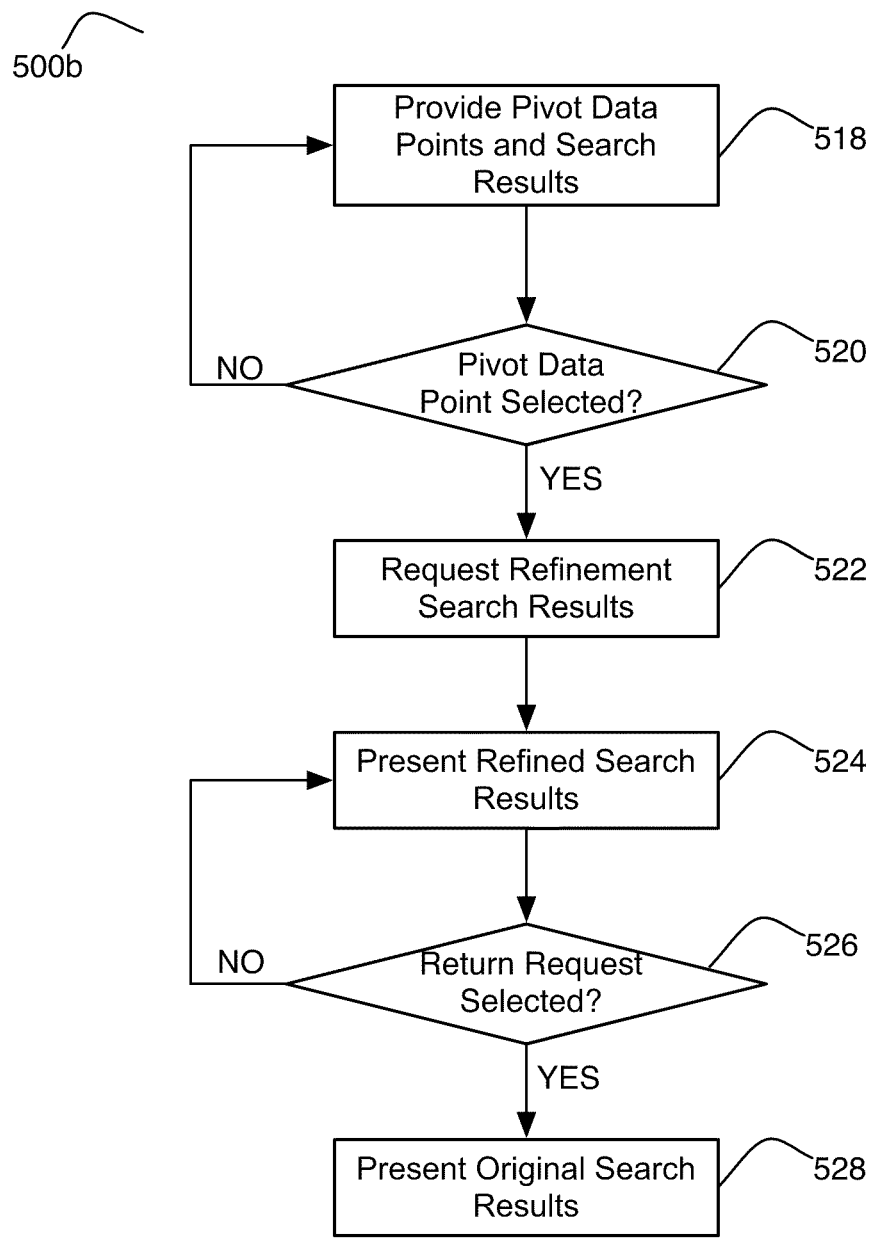
FIG. 5b presents a flow diagram illustrating a method for retrieving search results associated with a pivot data point according to one embodiment of the present invention.

FIG. 5b presents a flow diagram illustrating a method for retrieving search results associated with a pivot data point according to one embodiment of the present invention. According to the embodiment FIG. 5b illustrates, the method 500b provides pivots points and search results as previously discussed, step 518. The method 500b then monitors a SRP to detect user selection of one of the pivot data points, step 520. Selecting an application may comprise clicking on the object with a mouse, entering a keystroke, or any user input action known in the art. In one embodiment, monitoring user interaction may be accomplished via client-side executable code such as JavaScript, Flash, or similar client side techniques.

If the user does not select a pivot data point, the method 500b continues to provide the pivot data points, step 518. If the user selects a pivot data point, the method requests refinement search results, step 520. In one embodiment, requesting refinement search results may comprise executing a second search query identified by the active data link within the pivot data point. In one embodiment, the second search query may be performed synchronously, that is, reloading a second, distinct SRP. In alternative embodiment the second search query may be executed asynchronous, that is, simply reloading the search results without reloading the SRP.

The method 500b then presents the refined search results, step 524. As previously discussed, presenting the refined search results may comprising displaying a second SRP similar to the first SRP. In one embodiment, the second SRP may comprise additional elements indicating that the second SRP is a refinement of the first based on the pivot data point. For example, the second SRP may state that the search results are refined and may provide an option to return to the first SRP. In one embodiment, this may be a toggle selection to revert back to the original SRP.

The method 500b continues to display the refined SRP until the detection of a return request is detected, step 526. If the method 500b detects that a user submitted a return request, the method presented the original SRP, step 528. As previously discussed, the method 500b may present the original SRP via a synchronous or asynchronous request. It is also noted that the user may toggle between different pivot data point SRPs by selection different active data links while viewing a refined SRP.

Figure 6A:
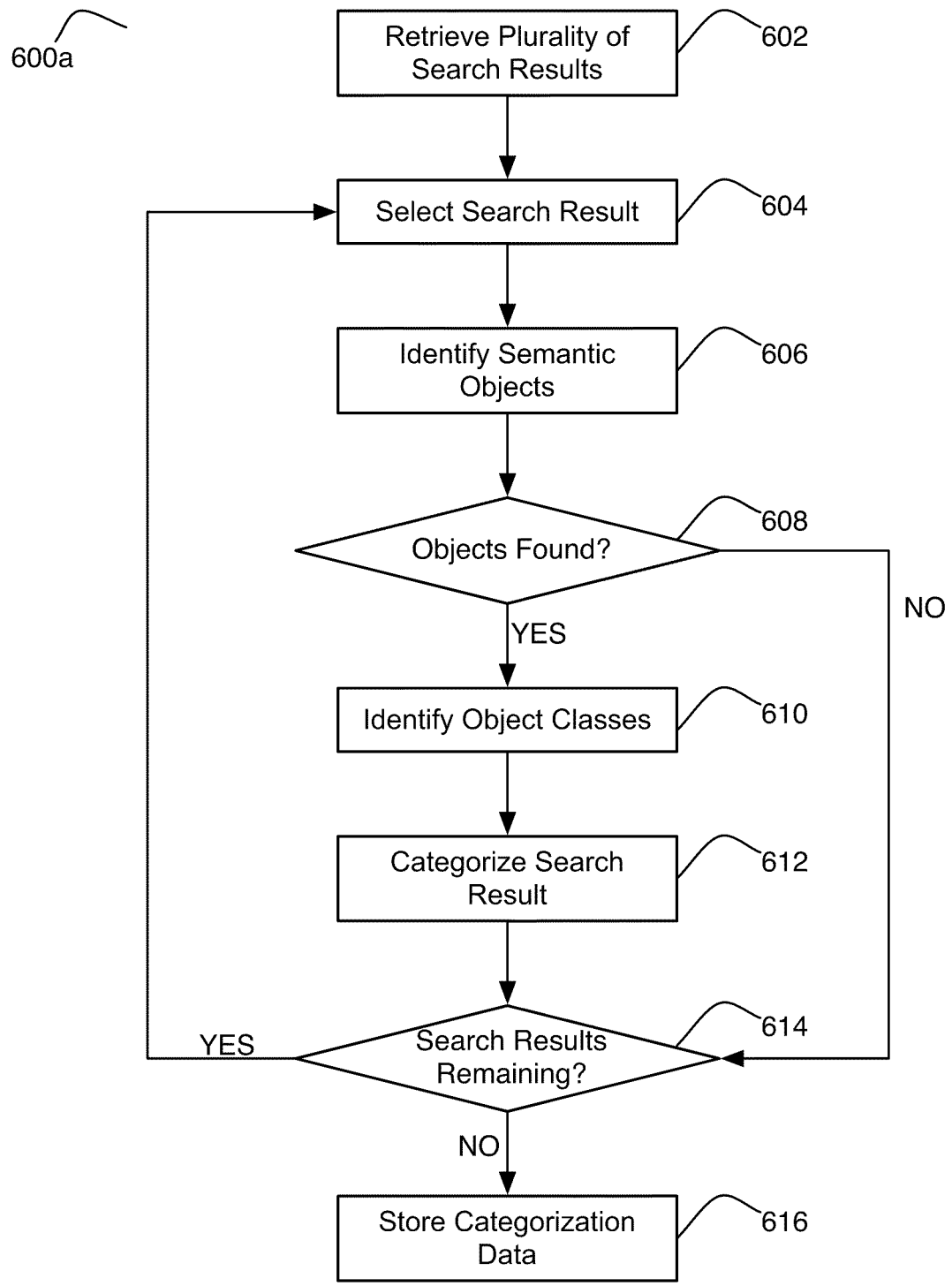
FIG. 6a presents a flow diagram illustrating a method for analyzing a search database and identifying semantic objects according to one embodiment of the present invention.

FIG. 6*a* presents a flow diagram illustrating a method for analyzing a search database and identifying semantic objects according to one embodiment of the present invention. It is noted that the steps of the method of FIGS. 6*a* and 6*b* may be performed, in one embodiment, using the system 300 of FIG. 3.

FIG. 6*a* illustrates, the method 600*a* retrieves a plurality of search results, step 602. Search result retrieval techniques are commonly known in the art and are not reiterated for the sake of brevity. The method 600*a* then selects a given search result, step 604, and continues to select search results until no search results remain, step 614. In an alternative embodiment, the method 600*a* may select a predefined number of search results to process.

After selecting a search result, the method 600*a* attempts to identify semantic objects within the search result, step 606. The method 600*a* may identify semantic objects by comparing the search result data with a stored list of semantic object definitions. In this embodiment, the method 600*a* may execute pattern-matching algorithms to determine if defined semantic objects are present within the search result. For example, a semantic object definition may state that textual data formatted according to the vCard file format will appropriately be considered as business cards, and thus recognizable objects.

If the method 600*a* does not find any semantic objects, the method 600*a* continues processing the remaining search results, step 608. If the method 600*a* determines that semantic objects exist, the method identifies the semantic object class, step 610.

In one embodiment, identifying a semantic object class may comprise inspecting the object definition to determine an appropriate object class. In this embodiment, the method 600*a* may query a class database or file that associates object types with defined classes. For example, a vCard object may be assigned to a Business class. Alternatively, semantic objects may be associated with multiple classes. For example, a vCard may be assigned to a Business and Person class.

The method 600*a* then categorizes the search result, step 612. In one embodiment, categorizing the search result may comprise associating the search result with the identified classes. The method 600*a* then stores the categorization data after all results have been processed, step 616. In one embodiment, storing the categorization data may comprise storing the associations created in step 612 in a long-term storage device such as a database.

Figure 6B:
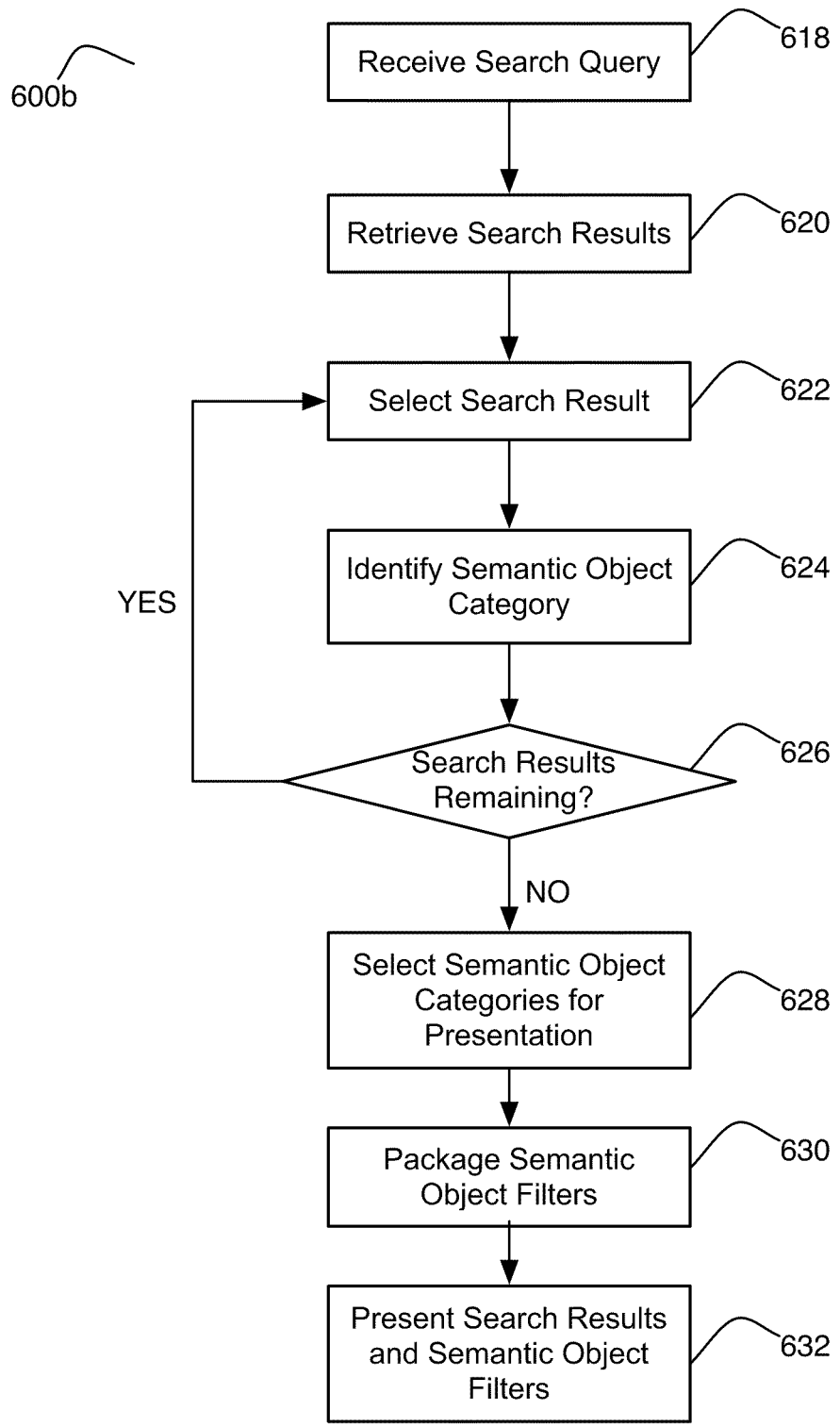
FIG. 6b presents a flow diagram illustrating a method for extracting semantic object identifying information from a plurality of search results and providing semantic category links to a user according to one embodiment of the present invention.

FIG. 6*b* presents a flow diagram illustrating a method for extracting semantic object identifying information from a plurality of search results and providing semantic category links to a user according to one embodiment of the present invention. According to the embodiment FIG. 6*b* illustrates, the method 600*b* receives a search query, step 618. In the illustrated embodiment, the method 600*b* may receive a search query via an HTTP request from an end user utilizing a search portal as known in the art. The method 600*b* subsequently retrieves search results associated with the query, step 620. Search result retrieval techniques are commonly known in the art and are not reiterated for the sake of brevity.

The method 600*b* then selects a given search result, step 622, and identifies a semantic object category, step 624. In the illustrated embodiment, identifying a semantic object category may comprise querying a semantic object database to determine if there is a match for the selected search result. As previously discussed with respect to FIG. 6*a*, a semantic object database may previously be filled with a list of search results and associated semantic object identifiers. For example, the method 600*b* may select a search result identified by a numeric identifier "1234". The method 600*b* may then query a semantic object database for all entries matching the identifier "1234". If a match is found, the method 600*b* successfully identifies semantic objects and stores the associated matches.

After analyzing the retrieved search results, the method 600*b* selects semantic object categories for presentation, step 628. In one embodiment, the method 600*b* may select a predetermined number of semantic objects. For example, a predefined schema may direct the method 600*b* to select only the top three occurring semantic objects (e.g., the top three semantic objects occurring within the search results).

The method 600*b* then packages the semantic objects, step 630. In one embodiment, packaging a semantic object may comprise generating a self-contained object that can be placed within an SRP. For example, the method 600*b* may generate or identify an image associated with the semantic object, an HTML active data link associated with the semantic object and associated executable code such as JavaScript that is associated with the semantic object. The method 600*b* may combine these and various other forms of data to generate the self-contained semantic object.

Finally, the method 600*b* presents the search results and semantic object categories, step 632. In one embodiment, the method 600*b* embeds the previous generated semantic object code within an SRP or SRP template, as previous discussed.

In one embodiment, the objects may be either structured or unstructured objects. Additionally, the object filters provide for filtering the search results based on a single web location content source, where that single web location may be a content general and user-action specific web location. As used herein, a content general and user-action specific web location is a web location that provides content of a general nature and allows for a specific user action. For example, the web location may be an audio/video distribution web location (e.g. www.youtube.com, www.hulu.com, etc.), a shopping location (e.g. www.amazon.com, etc.), a social media web location (e.g. www.facebook.com, www.linkedin.com, etc.) or a user generated content web location (e.g. en.wikipedia.com, etc.)

Figure 7:
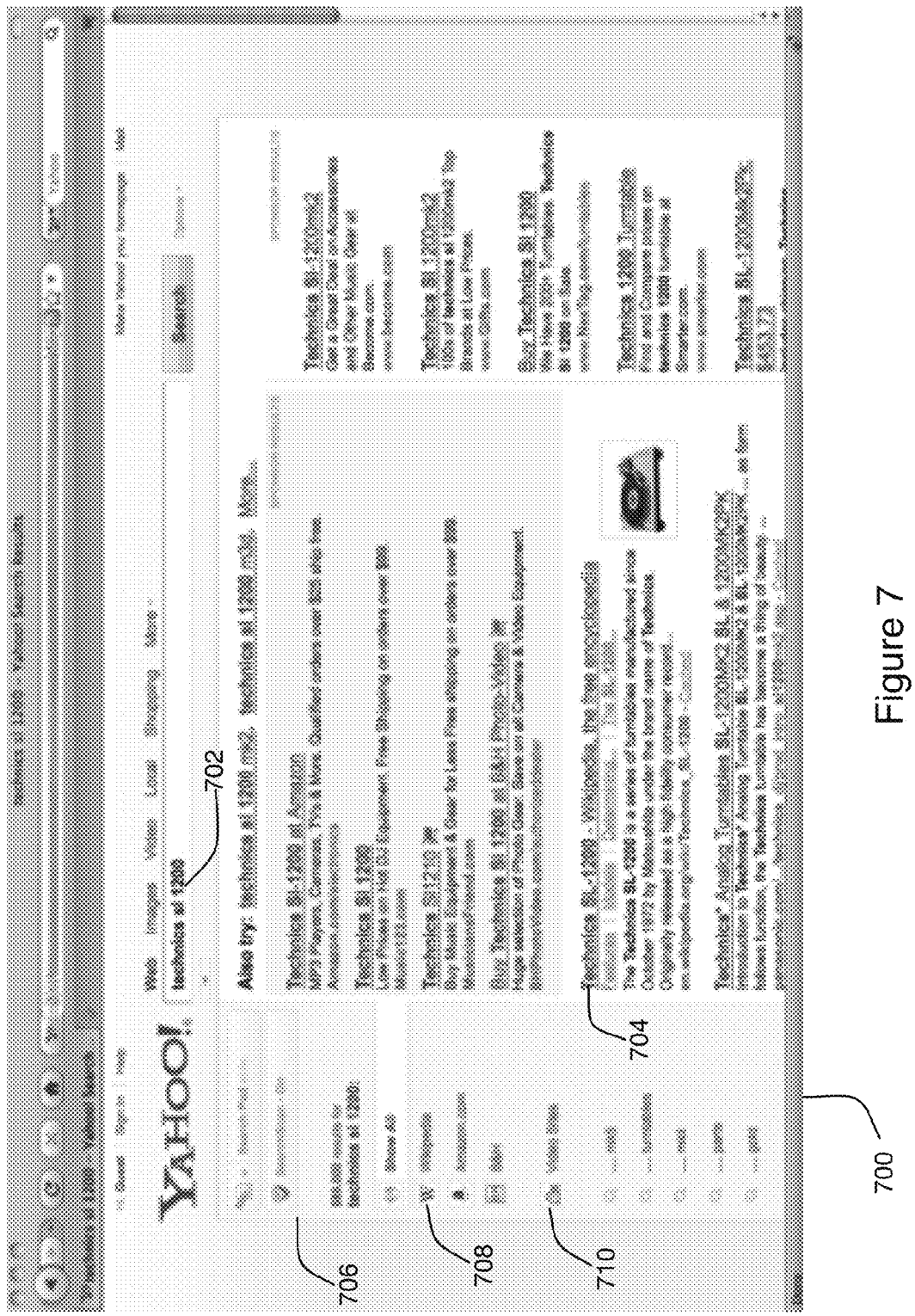
FIG. 7 presents a screen diagram illustrating a search results page according to one embodiment of the present invention.

FIG. 7 presents a screen diagram illustrating a search results page according to one embodiment of the present invention. According to the embodiment FIG. 7 illustrates, a general SRP 700 may be presented to the user comprising a plurality of components 702, 704, 706 and 708. As illustrated, the SRP comprises a text field 702 indicating the query the user has entered and a plurality of search results 704.

In addition to the search results 704, the SRP 700 also presents a sidebar 706 comprises various data objects including a plurality of pivot data points visible in the output display via the active data links 708 and a plurality of semantic object filters visible in the output display via the active data links 710. Pivot data points 708 and semantic object filters 710 may comprise HTML, image and JavaScript components as previous discussed. Furthermore, pivot data points 708 and semantic object filters 710 may be selected by the user as will be presented with respect to FIGS. 8 and 9.

Figure 8:
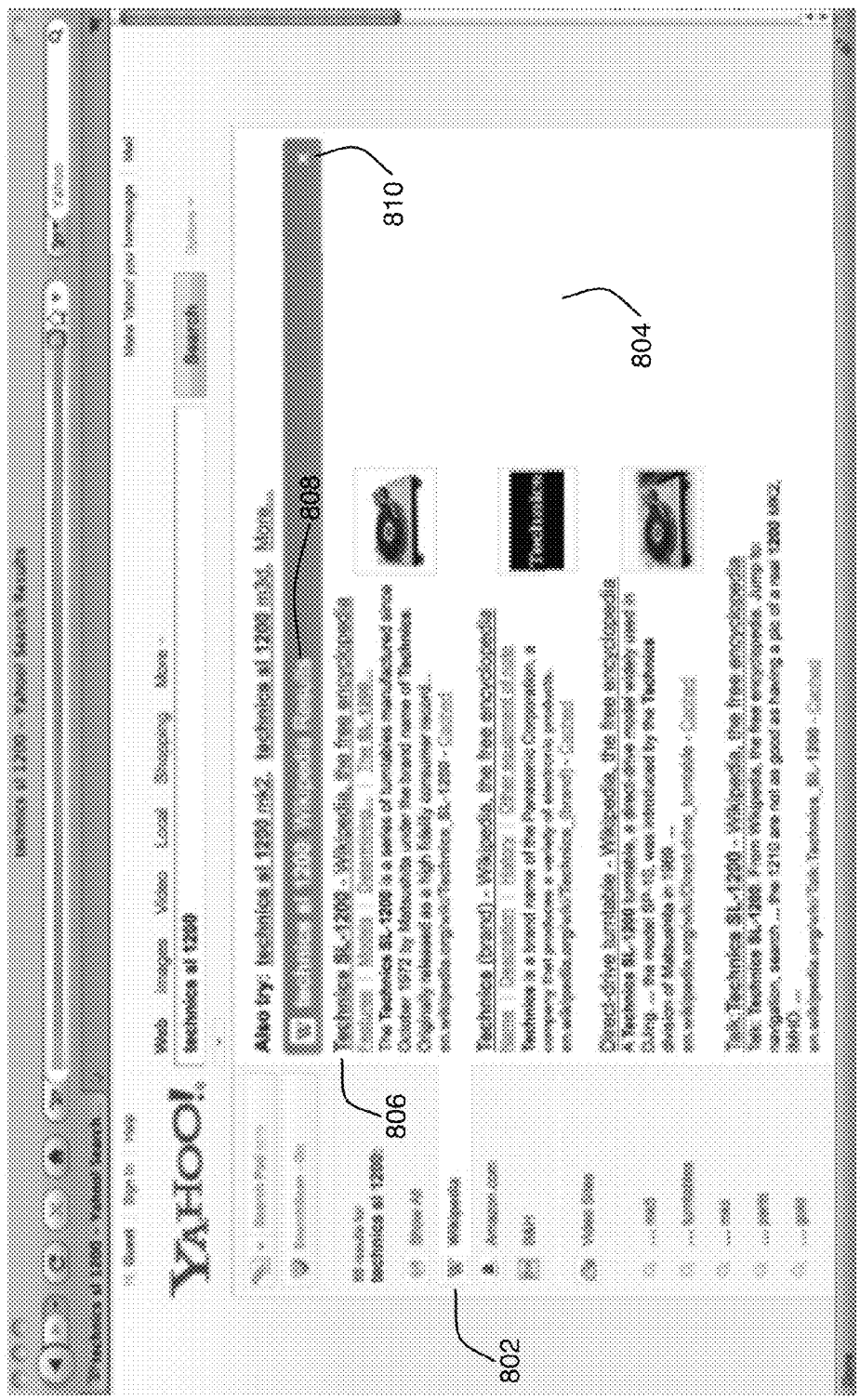
FIG. 8 presents a screen diagram illustrating a plurality of search results retrieved in response to the selection of a pivot data point according to one embodiment of the present invention.

FIG. 8 presents a sample screenshot of a plurality of search results retrieved in response to the selection of a pivot data point according to one embodiment of the present invention. According to the embodiment FIG. 8 illustrates, a refined SRP 800 is presented to the user in response to the selection of a pivot data point 802.

After the user selects the pivot data point 802 (labeled "Wikipedia"), the search results pane 804 is updated with results 806 only from the domain "http://en.wikipedia.org". Additionally, the updated SRP 800 provides a descriptive titlebar 808 indicating that the user has pivoted into a refined search results page. Finally, the updated SRP 800 titlebar 808 comprises a navigation control 810 that allows the user to return to the previous SRP 700.

Figure 9:
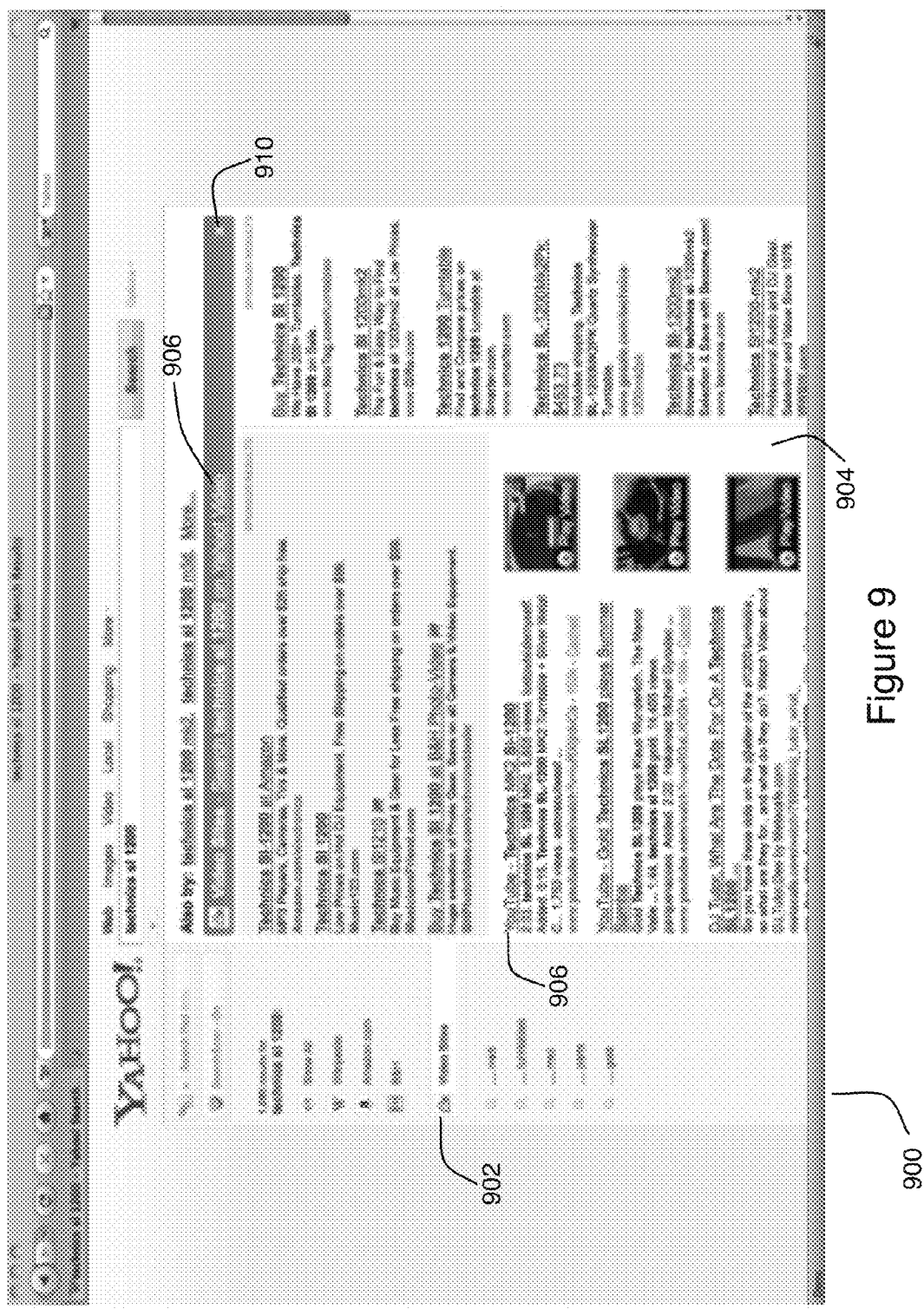
FIG. 9 presents a screen diagram illustrating a plurality of search results retrieved in response to the selection of a semantic category link according to one embodiment of the present invention.

FIG. 9 presents a sample screenshot of a plurality of search results retrieved in response to the selection of a semantic category link according to one embodiment of the present invention. According to the embodiment FIG. 9 illustrates, a refined SRP 900 is presented to the user in reponse to the selection of a semantic object filter 902.

After the user selects the semantic object filter 802 (labeled "Video Sites"), the search results pane 904 is updated with results 906 that only contain video objects (e.g., YouTube pages). In alternative embodiments, a plurality of other objects 802 may be presented to the user in conjunction with other objects. For example, Person or Product objects may be displayed alongside the semantic object filter 802. Additionally, the updated SRP 900 provides a descriptive title bar 906 indicating that the user has pivoted into a refined search results page. Finally, the updated SRP 900 title bar 908 comprises a navigation control 910 that allows the user to return to the previous SRP 700.

FIGS. 1 through 9 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for generating search results, the method comprising: receiving a search request including at least one search term;
    accessing a corpus of data relating to web content to determine relevant content for inclusion in a search result set on the basis of the search request;
    extracting a plurality of pivot metrics based on the search result, the pivot metrics comprise domain specific attributes;
    generating a plurality of domain specific pivot data points based on the pivot metrics, wherein each domain specific pivot data point exceed a predetermined threshold of matched search results;
    generating a representation of the domain specific pivot data point, the representation comprises an active data link and an image associated with a given pivot data point, the active data link includes a refined search result set on the basis of the given pivot data point;
    generating a search result output display that includes the presentation of at least a portion of the search result set, the active data links, and the images, wherein the search result set comprises accumulated results associated with a plurality of different active data links; and
    in response to a selection of a given active data link for one of the domain specific pivot data points, toggling the search result output display therewith presenting a refined portion of the search results set, the refined result set consisting results associated with the selected active data link.

2. The method of claim 1 further comprising: upon selection of one of the active data links, displaying an exit toggle display to revert back to the search result set.

3. The method of claim 1, wherein the refinement is a search results display of a search using the at least one search term of the content specific web location.

4. A system for generating search results, the system comprising: a non-transitory computer readable medium having executable instructions stored therein, and a processing device, in response to the executable instructions, operative to:
  receive a search request including at least one search term;
  access a corpus of data relating to web content to determine relevant content for inclusion in a search result set on the basis of the search request;
  extract a plurality of pivot metrics based on the search result, the pivot metrics comprise domain specific attributes;
  generate a plurality of domains specific pivot data points based on the pivot metrics, wherein each domain specific pivot data point exceed a predetermined threshold of matched search results;
  generate a representation of the domain specific pivot data point, the representation comprises an active data link and an image associated with a given pivot data point, the active data link includes a refined search result set on the basis of the given pivot data point;
  generate a search result output display that includes the presentation of at least a portion of the search result set, the active data links, and the images, wherein the search result set comprises accumulated results associated with a plurality of different active data links; and
  in response to a selection of a given active data link for one of the domain specific pivot data points, toggle the search result output display therewith presenting a refined portion of the search results set, the refined result set consisting results associated with the selected active data link.

5. The system of claim 4, wherein the processing device, in response to executable instructions, is further operative to:
  upon selection of one of the active data links, display an exit toggle display to revert back to the search result set.

6. The system of claim 4, wherein the refinement is a search results display of a search using the at least one search term of the content specific web location.

7. A non-transitory computer readable media comprising program code that when executed by a programmable processor causes execution of a method for generating search results, the non-transitory computer readable media including:
  program code for receiving a search request including at least one search term;
  program code for accessing a corpus of data relating to web content to determine relevant content for inclusion in a search result set on the basis of the search request;
  program code for extracting a plurality of pivot metrics based on the search result, the pivot metrics comprise domain specific attributes;
  program code for generating a plurality of domain specific pivot data points based on the pivot metrics, wherein each domain specific pivot data point exceed a predetermined threshold of matched search results;
  program code for generating a representation of the domain specific pivot data point, the representation comprises an active data link and an image associated with a given pivot data point, the active data link includes a refined search result set on the basis of the given pivot data point;
  program code for generating a search result output display that includes the presentation of at least a portion of the search result set, the active data links, and the images, wherein the search result set comprises accumulated results associated with a plurality of different active data links; and
  in response to a selection of a given active data link for one of the domain specific pivot data points, program code for toggling the search result output display therewith presenting a refined portion of the search results set, the refined result set consisting results associated with the selected active data link.

8. The computer readable media of claim 7 further comprising: program code for, upon selection of one of the active data links, displaying an exit toggle display to revert back to the search result set.

9. The computer readable media of claim 7, wherein the refinement is a search results display of a search using the at least one search term of the content specific web location.

* * * * *